United States Patent
Kawamura

(10) Patent No.: US 9,553,434 B2
(45) Date of Patent: Jan. 24, 2017

(54) ELECTRONIC COMPONENT ASSEMBLY STRUCTURE AND ELECTRICAL JUNCTION BOX

(71) Applicant: Yazaki Corporation, Minato-ku, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 7 days.

(21) Appl. No.: 14/851,375

(22) Filed: Sep. 11, 2015

(65) Prior Publication Data

US 2016/0006228 A1 Jan. 7, 2016

Related U.S. Application Data

(63) Continuation of application No. PCT/JP2014/056696, filed on Mar. 13, 2014.

(30) Foreign Application Priority Data

Mar. 14, 2013 (JP) .................................. 2013-051529

(51) Int. Cl.
*G06F 1/16* (2006.01)
*H02G 3/08* (2006.01)
(Continued)

(52) U.S. Cl.
CPC .............. *H02G 3/086* (2013.01); *H01R 33/76* (2013.01); *H02G 3/081* (2013.01); *H01R 9/223* (2013.01); *H01R 13/4223* (2013.01)

(58) Field of Classification Search
CPC .. G06F 1/1601–1/1611; G06F 1/1613–1/1698; G06F 1/18–1/189; H05K 5/00–5/069; H05K 7/00–7/186
(Continued)

(56) References Cited

U.S. PATENT DOCUMENTS 6,937,461 B1* 8/2005 Donahue, IV ....... H01R 13/514
174/50
7,697,284 B2* 4/2010 Lin .......................... G06F 1/181
312/223.2
(Continued)

FOREIGN PATENT DOCUMENTS

JP 63-146939 U 9/1988
JP 09-140029 A 5/1997
(Continued)

OTHER PUBLICATIONS

Communication dated Apr. 5, 2016, from the Japanese Patent Office in counterpart application No. 2015-505551.
(Continued)

*Primary Examiner* — Anthony Haughton
*Assistant Examiner* — Razmeen Gafur
(74) *Attorney, Agent, or Firm* — Sughrue Mion, PLLC

(57) ABSTRACT

An electronic component includes a main body section having a plurality of surfaces and a terminal portion that is disposed in the main body section and that is fitted to a terminal fitting. A housing member includes a first housing chamber that guides and accommodates the main body section and a second housing chamber that accommodates and holds the terminal fitting. The terminal portion includes a base end and a fitting portion that extends from a protruding tip of the base end and that is fitted to the terminal fitting. The fitting portion extends from the protruding tip of the base end, along a side surface of the main body section with a gap from the side surface, without causing an extending tip to protrude beyond the deep surface.

8 Claims, 15 Drawing Sheets

(51) Int. Cl.
*H01R 33/76* (2006.01)
*H05K 5/00* (2006.01)
*H05K 7/00* (2006.01)
*H01R 9/22* (2006.01)
*H01R 13/422* (2006.01)

(58) Field of Classification Search
USPC ..................... 361/679.01–679.45,
679.55–679.61,361/724–727,
679.26–679.3, 679.31–679.39,361/756,
741, 686, 687, 688, 696, 697,
787,361/789, 794, 701–703, 709,
807–810; 455/575.1–575.9;
312/223.1–223.3; 349/787, 789, 794,
58–60
See application file for complete search history.

(56) References Cited

U.S. PATENT DOCUMENTS

| | | | | |
|---|---|---|---|---|
| 7,710,718 | B2* | 5/2010 | Merkin | G06F 1/206 361/679.33 |
| 8,159,820 | B2* | 4/2012 | Ibori | H02M 7/003 174/252 |
| 8,289,709 | B2* | 10/2012 | Feltner | H05K 7/20909 165/104.33 |
| 8,411,441 | B2* | 4/2013 | Nakatsu | H02M 7/003 165/104.33 |
| 8,450,864 | B2* | 5/2013 | Kawakita | F02B 63/04 290/1 A |
| 8,520,394 | B2* | 8/2013 | Wakita | B62D 5/0406 165/104.33 |
| 8,737,076 | B2* | 5/2014 | Wright | H05K 7/20945 361/643 |
| 8,767,401 | B2* | 7/2014 | Kim | H05K 7/20909 361/697 |
| 8,792,244 | B2* | 7/2014 | Funatsu | H05K 7/20927 361/676 |
| 2002/0030966 | A1* | 3/2002 | Huggins | G06F 1/16 361/679.58 |
| 2004/0070946 | A1* | 4/2004 | Matsuo | H01L 23/24 361/709 |
| 2005/0208904 | A1* | 9/2005 | Sit | H04B 1/03 455/90.3 |
| 2005/0275499 | A1 | 12/2005 | Kita | |
| 2008/0130223 | A1* | 6/2008 | Nakamura | H02M 7/003 361/689 |
| 2010/0271168 | A1 | 10/2010 | Niedzwiecki et al. | |
| 2011/0012735 | A1* | 1/2011 | Kestenbaum | G06K 17/00 340/568.1 |
| 2011/0032676 | A1* | 2/2011 | Matsuo | H01L 23/473 361/703 |
| 2011/0044010 | A1* | 2/2011 | Ledezma | H02M 7/003 361/727 |
| 2011/0188200 | A1* | 8/2011 | Takahashi | B61C 17/00 361/690 |
| 2011/0199736 | A1* | 8/2011 | Sawada | H05K 7/20909 361/722 |
| 2011/0216545 | A1* | 9/2011 | Russo | H01R 9/031 362/362 |
| 2012/0162912 | A1* | 6/2012 | Kim | H05K 7/20909 361/692 |
| 2012/0320528 | A1* | 12/2012 | Akiyama | H05K 7/20927 361/702 |
| 2013/0223009 | A1* | 8/2013 | Nakatsu | H02M 7/003 361/699 |
| 2013/0237078 | A1 | 9/2013 | Ikeda et al. | |
| 2013/0301220 | A1* | 11/2013 | Hotta | H02K 11/33 361/699 |

FOREIGN PATENT DOCUMENTS

| | | |
|---|---|---|
| JP | 2001-167680 A | 6/2001 |
| JP | 2004-064871 A | 2/2004 |
| JP | 2005-353465 A | 12/2005 |
| JP | 2010-221787 A | 10/2010 |
| JP | 2012-119292 A | 6/2012 |

OTHER PUBLICATIONS

International Search Report for PCT/JP2014/056696 dated Jun. 10, 2014.

* cited by examiner

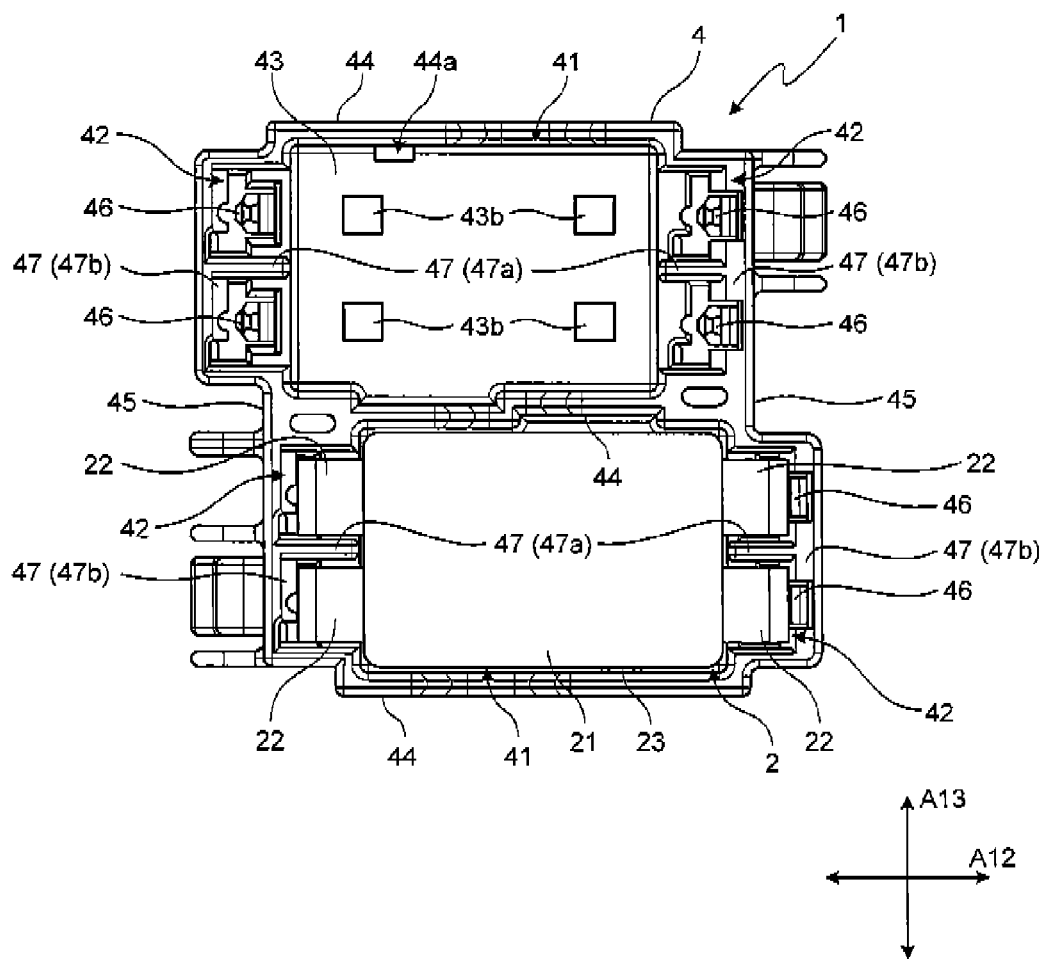

ELECTRONIC COMPONENT ASSEMBLY STRUCTURE AND ELECTRICAL JUNCTION BOX

CROSS-REFERENCE TO RELATED APPLICATION

This application is a continuation application of International Application PCT/JP2014/056696, filed on Mar. 13, 2014, and designating the U.S., the entire contents of which are incorporated herein by reference.

BACKGROUND OF THE INVENTION

1. Field of the Invention

The present invention relates to an electronic component assembly structure for mutually assembling an electronic component, a terminal fitting of an electrical wire, and a housing member accommodating the electronic component and the terminal fitting therein and an electrical junction box having the assembly structure.

2. Description of the Related Art

In general, a vehicle such as an automobile is equipped with an electronic component module in which various electronic components are assembled. Japanese Patent Application Laid-open No. 2010-221787 discloses a configuration of an electrical junction box (junction box) including a relay module to control connection between a power supply device and an electric component.

FIG. 19 illustrates a configuration of a relay module according to the related art. Such a relay 90 includes a relay body 91 formed in a rectangular parallelepiped shape and plural plate-like relay terminals 92 protruding in a straight line shape from one surface (bottom surface) of the relay body 91. Such a type of relay 90 is assembled into a resinous holding member 95, which holds a terminal fitting 94 connected to an electrical wire 93, to constitute a relay module. The relay module is assembled into an electrical junction box. A spring portion 96 to which the relay terminal 92 is fitted is formed in the terminal fitting 94. The relay 90 is held by the holding member 95 by inserting and fitting tips of the plural relay terminals 92 into and to the spring portions 96. FIG. 19 is basically a longitudinal-sectional view of the relay module according to the related art and illustrates only the relay body 91 in a side view.

In the relay module according to the related art illustrated in FIG. 19, the relay terminals 92 protrude from a bottom surface 91a of the relay body 91. Accordingly, in assembling the relay 90 into the holding member 95, it is necessary to position the relay terminal 92 with respect to the terminal fittings 94 and to insert and fit the tips of the relay terminal 92 into and to the spring portion 96. However, since the gravitational center of the relay 90 is located in the relay body 91, the relay 90 is likely to be inclined. In addition, since the terminal fittings 94 into which the relay terminals 92 are inserted are smaller than the relay 90, it is difficult to position the relay 90 such that the relay terminals 92 are inserted in an appropriate insertion direction into the terminal fittings 94. When the relay terminals 92 are fitted to the spring portions 96 of the terminal fittings 94, the relay terminals 92 are covered with the relay body 91 and enter blind spots and it is thus difficult to visually check a state such as a position or an inclination of the relay terminal 92 at the time of fitting. In this way, workability for assembling the relay 90 into the holding member 95 is poor and there is demand for improvement thereof.

SUMMARY OF THE INVENTION

The present invention is made in consideration of the above-mentioned situations and an object thereof is to achieve improvement in workability in assembling an electronic component into an electronic component module.

In order to solve the above mentioned problem and achieve the object, an electronic component assembly structure according to one aspect of the present invention includes an electronic component; a terminal fitting configured to be fitted to the electronic component; and a housing member configured to accommodate the electronic component and the terminal fitting, wherein the electronic component includes a main body section having a plurality of surfaces and a terminal portion that is disposed in the main body section and that is fitted to the terminal fitting, the housing member includes a first housing chamber that guides and accommodates the main body section and a second housing chamber that accommodates and holds the terminal fitting, the terminal portion includes a base end and a fitting portion that extends from a protruding tip of the base end and that is fitted to the terminal fitting, the fitting portion extends from the protruding tip of the base end, along a side surface of the main body section with a gap from the side surface, without causing an extending tip to protrude beyond the deep surface of the main body section in the receiving direction into the first housing chamber, and the electronic component, the terminal fitting, and the housing member are mutually assembled.

Accordingly, in assembling an electronic component into the housing member, the main body section can be inserted into and accommodated in the first housing chamber before the fitting portion of the terminal portion is fitted to the terminal fitting. At this time, since the main body section can be guided to the first housing chamber of the housing member, it is possible to prevent inclination of the electronic component with respect to the housing member. Accordingly, it is possible to assemble the electronic component into the housing member in a state in which the electronic component is positioned with respect to the housing member in an appropriate insertion posture. In assembling the electronic component into the housing member, first, the main body section only has to be inserted into and accommodated in the first housing chamber. Accordingly, the insertion destination target is large and it is thus possible to easily assemble the electronic component into the housing member.

In this case, the housing member may include an interference portion which interferes with the electronic component at the time of assembly of the electronic component. For example, the housing member may include an interference portion that interferes with the electronic component at the time of assembly of the electronic component, the interference portion includes at least one of a first interference portion and a second interference portion, the first interference portion is disposed in the first housing chamber so as to interfere with the main body section to regulate inclination of the electronic component when the electronic component is inclined, and the second interference portion is disposed in the second housing chamber so as to interfere with the fitting portion to regulate inclination of the electronic component when the electronic component is inclined.

In this way, by providing the housing member with the interference portion, the electronic component can be caused to interfere with the interference portion to regulate the inclination of the electronic component even when the electronic component is inclined at the time of assembly thereof to the housing member. That is, it is possible to prevent inclination of the electronic component by guiding the main body section to the first housing chamber of the housing member and it is also possible to prevent inclination of the electronic component using the interference portion. Accordingly, it is possible to further satisfactorily position the electronic component with respect to the housing member in an appropriate insertion position.

It is preferable that the first housing chamber includes a bottom portion and a wall portion that extends upright from the bottom portion and that guides the main body section, and a through-hole that is opened to the outside is formed in the bottom portion.

In the electronic component assembly structure according to the present invention, the base end of the terminal portion protrudes from at least one surface of the main body section and the fitting portion extends from the protruding tip of the base end, along the side surface of the main body section with a gap from the side surface, without causing the extending tip to protrude beyond the deep surface of the main body section in the receiving direction into the first housing chamber. Accordingly, even in a state in which the electronic component is assembled with the housing member, the top surface of the main body section or the base end of the terminal portion can be made to face the outside. Therefore, heat generated from the electronic component can be discharged to the outside from the base end of the terminal portion, the top surface of the main body section, and the like, and the heat can be discharged to the outside from the through-hole by forming the through-hole in the bottom of the housing member. Accordingly, it is possible to more effectively prevent heat or the like generated from the main body section from being confined to the first housing chamber and thus to surely reduce an influence of the heat on a relay operation.

When the electrical junction box having the above-mentioned electronic component assembly structure is employed, it is possible to achieve improvement in assembling property of an electronic component into the electrical junction box.

The present invention is briefly explained as described above. Further, a detail of the present invention will be more clarified by reading through a mode for carrying out the invention described below (hereinafter referred to as "embodiment") by referring to the accompanying drawings.

BRIEF DESCRIPTION OF THE DRAWINGS

FIG. 2 is a plan view (where one of two relays is not illustrated) of the relay module illustrated in FIG. 1;

DETAILED DESCRIPTION OF THE PREFERRED EMBODIMENTS

Hereinafter, an electronic component module having an electronic component assembly structure according to an embodiment of the present invention will be described with reference to the accompanying drawings. In this embodiment, a relay is used as an electronic component, but the electronic component is not limited to the relay and may employ another electronic component having a configuration common to the relay which will be described below, such as a fuse or a module component incorporated into a substrate. The usage of the relay module according to this embodiment is not particularly limited, but a case can be considered in which the relay module is used for equipment or the like for controlling a connection state between a power supply device and an electric component in a vehicle such as an automobile. Such a type of relay module only has to be provided as one constituent member of an electrical junction box, but may be treated as a single body other than a constituent member of the electrical junction box and may guarantee a relay function even as a single body.

Figure 1:
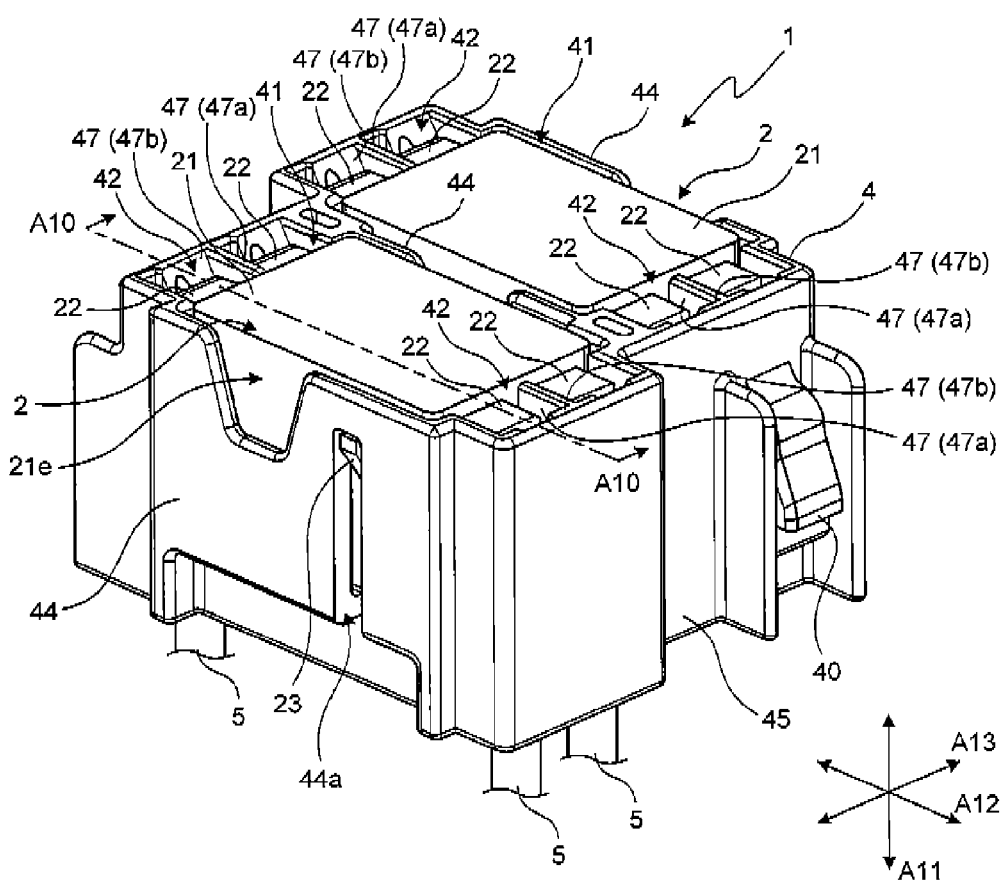
FIG. 1 is a perspective view illustrating an entire configuration of a relay module in which a relay, a terminal fitting, and a housing member are mutually assembled.
Figure 3A:
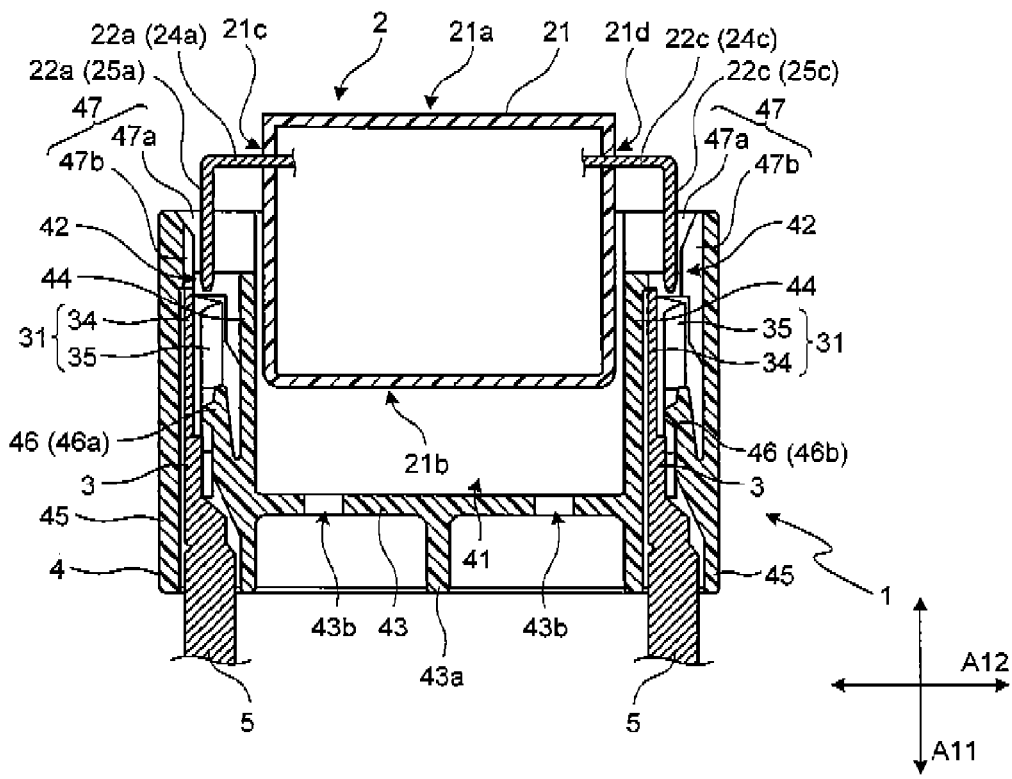
FIG. 3A is a longitudinal-sectional view of the relay module when viewed from the direction of arrow A10 in FIG. 1 and illustrates a state in which the relay is being accommodated in the housing member.
Figure 3B:
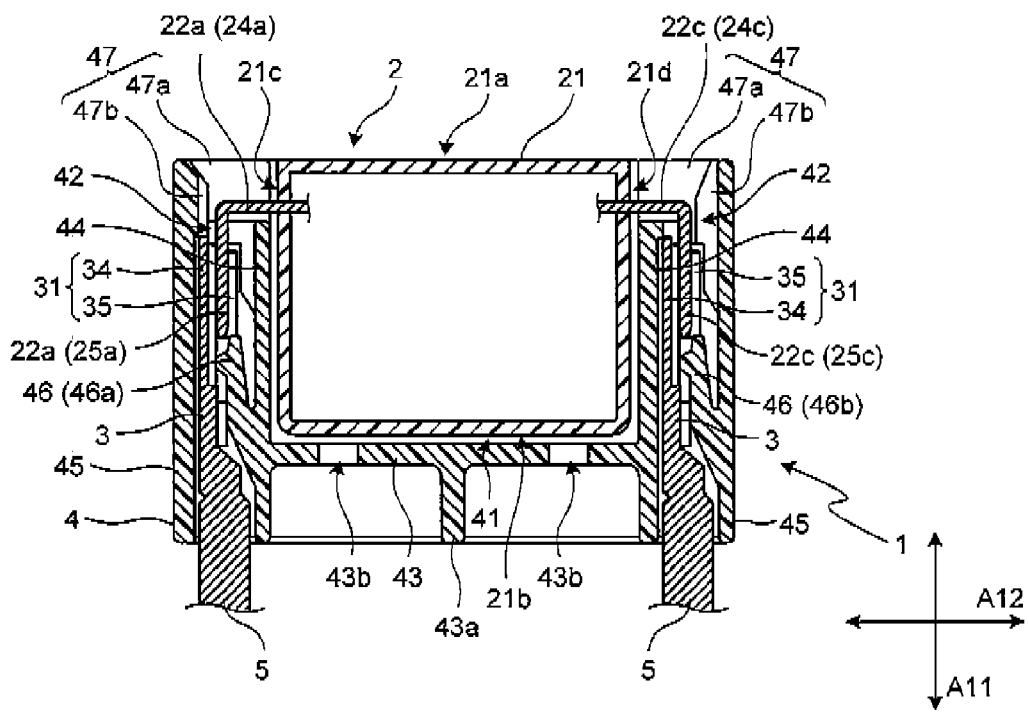
FIG. 3B is a longitudinal-sectional view of the relay module when viewed from the direction of arrow A10 in FIG. 1 and illustrates a state after the relay has been accommodated in the housing member.

FIGS. 1 to 3B illustrate a relay assembly structure according to an embodiment of the present invention. FIG. 1 is a diagram illustrating an entire configuration of a relay module 1 in which a relay 2, a terminal fitting 3, and a housing member 4 are mutually assembled. FIG. 2 is a plan view (where one of two relays 2 is not illustrated) of the relay module 1. FIGS. 3A and 3B illustrate longitudinal-sections of the relay module 1 when viewed from the direction of arrow A10 in FIG. 1, where FIG. 3A is a diagram illustrating a state in which the relay 2 is being accommodated in the housing member 4 and FIG. 3B is a diagram illustrating a state after the relay 2 has been accommodated in the housing member 4. In the following description, a direction indicated by arrow A11 in FIG. 1 is defined as an up-down direction, a direction indicated by arrow A12 is defined as a right-left direction, and a direction indicated by arrow A13 is defined as a front-back direction (hereinafter, the same applies to the drawings other than FIG. 1). Regarding the up-down direction, the upward direction in FIG. 1 is defined as upward (upside) and the downward direction is defined as downward (downside). However, the up-down direction, the right-left direction, and the front-back direction may not match the respective directions in a state in which the relay module 1 is actually mounted on a vehicle (for example, the up-down direction, the right-left direction, and the front-back direction of a vehicle). Various components accommodated in a relay body 24 are not illustrated in FIGS. 3A and 3B (the same applies to FIG. 7).

In this embodiment, the relay module 1 has a configuration in which the relay 2, the terminal fitting 3 (3a to 3d) that is fitted to the relay 2, and the housing member 4 that accommodates the relay 2 and the terminal fitting 3 therein are mutually assembled. The relay 2 includes a main body section (hereinafter, referred to as a relay body) 21 that has plural surfaces and a terminal portion (hereinafter, referred to as a tab) 22 that is disposed in the relay body 21 and that is fitted to the terminal fitting 3. In this embodiment, as illustrated in FIG. 1, it is assumed that one relay module 1 includes two relays 2. However, the number of relays constituting one relay module is not particular limited and the relay module may include only one relay or may include three or more relays. When the relay module includes plural relays, only the same type of relays 2 as illustrated in FIG. 1 may be employed or different types of relays (for example, relays 2a to 2k illustrated in FIGS. 8 to 18) may be mixed.

Figure 4:
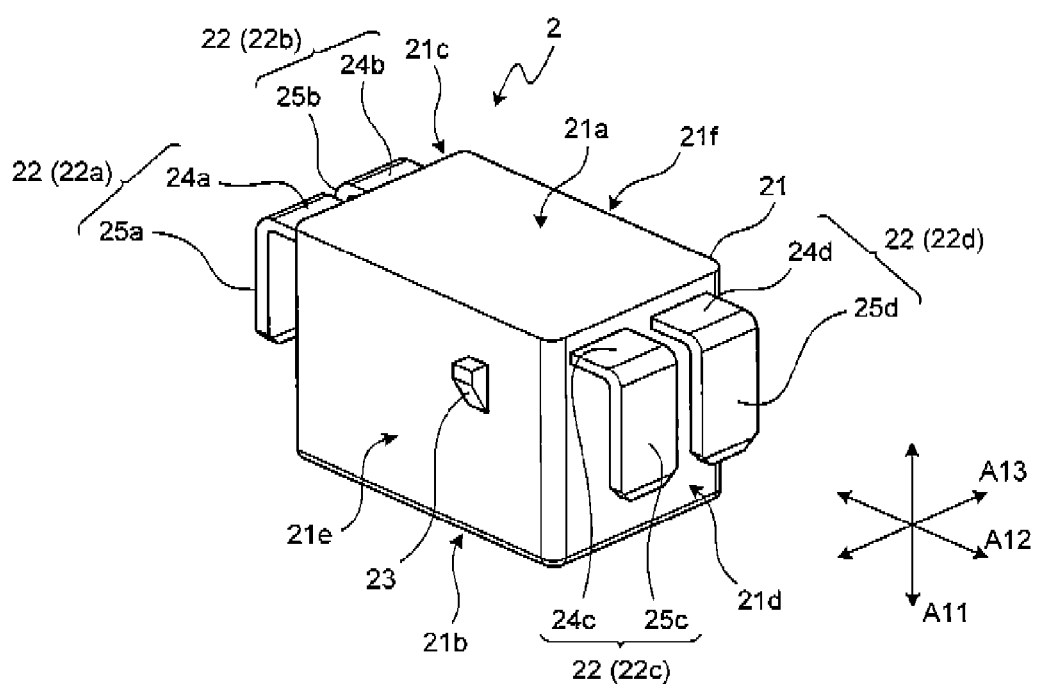
FIG. 4 is a perspective view illustrating a configuration of a relay according to an embodiment.

FIG. 4 illustrates an example of the relay 2 according to this embodiment. The relay 2 has a configuration in which the relay body 21 is formed of a resin or the like to have a substantially rectangular parallelepiped shape and four conductive metal tabs 22 are disposed to extend from the relay body 21 in a plate shape. The relay body 21 is a hexahedron including surfaces facing each other in the up-down direction (hereinafter, referred to as a top surface 21a and a bottom surface 21b), surfaces facing each other in the right-left direction (hereinafter, referred to as a left side surface 21c and a right side surface 21d), and surfaces facing each other in the front-back direction (hereinafter, referred to as a front surface 21e and a back surface 21f). In this case, the relay body 21 has a substantially rectangular parallelepiped shape which is long in the right-left direction and is positioned such that the left side surface 21c, the right side surface 21d, the front surface 21e, and the back surface 21f are side surfaces.

Each tab 22 includes a base end 24 (24a to 24d) protruding from at least one surface of the relay body 21 and a fitting portion 25 (25a to 25d) that extends from the protruding tip of the base end 24 and that is fitted to the terminal fitting 3. The number of tabs 22 or the width or thickness thereof can be arbitrarily set. For example, when the relay 2 includes plural tabs 22, all the tabs 22 may be set to have the same width and the same thickness or the tabs 22 may be set to have different widths or thicknesses.

FIG. 4 illustrates an example of the configuration of the tabs 22 in which the base ends 24a and 24b of two tabs 22a and 22b among four tabs 22 protrude from the vicinity of the top end of the left side surface 21c and the base ends 24c and 24d of the other two tabs 22c and 22d protrude from the vicinity of the top end of the right side surface 21d. In this case, the widths (sizes in the front-back direction) of the four tabs 22a to 22d are set to the same value. The base ends 24a and 24b of the two tabs 22a and 22b on the left side surface 21c protrude with a predetermined gap in the front-back direction therebetween and the base ends 24c and 24d of the two tabs 22c and 22d on the right side surface 21d protrude with the same gap in the front-back direction as that between the base ends 24a and 24b. Here, the four base ends 24a to 24d protrude by the same length (size in the right-left direction) from the same height (positions at which the sizes from the bottom surface 21b in the up-down direction are the same). Here, the base ends 24 may protrude from different heights or may protrude by different lengths.

Each fitting portion 25 extends from the protruding tip of the base end 24 along the side surface with a gap from the side surface of the relay body 21 without causing the extending tip to protrude beyond the deep surface (bottom surface 21b) of the relay body 21 in the receiving direction into the housing member 4 (which corresponds to downward in the up-down direction in this embodiment). Here, the "deep surface of the relay body 21 in the receiving direction into the housing member 4" can be typically mentioned to be a surface of the relay body 21 protruding most to the housing member 4 (a first housing chamber 41) in assembling the relay 2 into the housing member 4 as illustrated in FIG. 3A and the like. From another point of view, the extending length of the tab 22 from the base end 24 (length from the bent portion) is set such that the extending length in the up-down direction of the fitting portion 25 is smaller than the height of the relay body 21 (size in the up-down direction). In this embodiment, the four fitting portions 25a to 25d are set to have the same extending length and the positions of the extending tips of the fitting portions 25 are set to the same height (positions at which the sizes from the bottom surface 21b in the up-down direction are the same). Here, the fitting portions 25 may have a configuration in which the positions of the extending tips are different from each other in the up-down direction extended from the base ends 24, that is, a configuration in which the positions of the extending tips are set to have different heights. In this embodiment, the fitting portions 25 are configured to be bent substantially at right angle and downward from the protruding tips of the base ends 24 and extend in parallel to a pair of side surfaces (the left side surface 21c and the right side surface 21d) located in the longitudinal direction (right-left direction) of the relay body 21.

Figure 5:
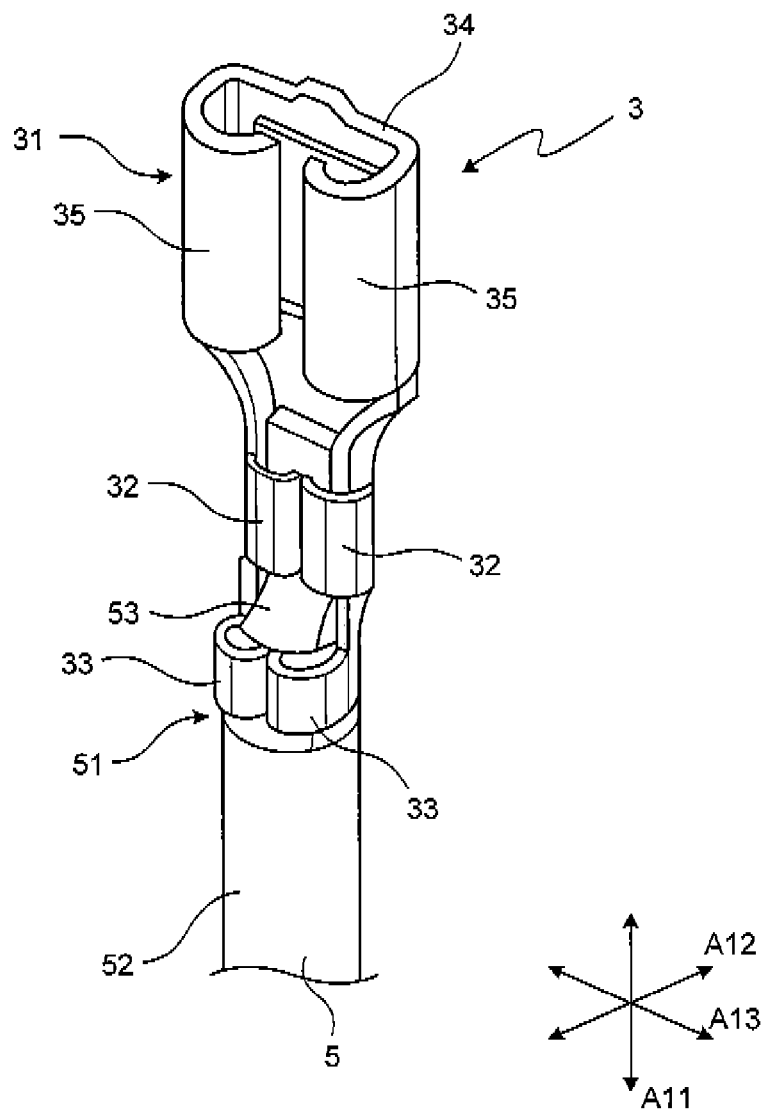
FIG. 5 is a perspective view illustrating a configuration of a terminal fitting according to the embodiment.

FIG. 5 illustrates an example of the configuration of the terminal fitting 3 according to this embodiment. The terminal fitting 3 is an interface member that is connected to a terminal portion 51 of an electrical wire 5 so as to electrically connect the electrical wire 5 to the relay 2. The terminal fitting 3 is formed by machining a conductive metal sheet and includes a female connection portion 31 to which the fitting portion 25 of the tab 22 is fitted, a pair of core clamping pieces 32 that caulk a core wire 53 exposed by peeling an insulating coating 52 of the terminal portion 51 of the electrical wire 5, and a pair of external clamping pieces 33 that caulk a tip of the insulating coating 52 of the electrical wire 5.

The connection portion 31 includes a flat plate portion 34 that supports the fitting portion 25 of the fitted tab 22 and a spring portion 35 that presses the fitting portion 25 and is configured to fit the fitting portion 25, which is pressed against the plate portion 34 by the spring portion 35, between the plate portion 34 and the spring portion 35. The spring portion 35 is formed in a pair of convex shapes by causing both ends in the front-back direction of the plate portion 34 to extend upright and curving the tips thereof toward the vicinity of the center in the front-back direction of the plate portion 34. Accordingly, the spring portion 35 applies a pressing force (elastic restoration force) to the fitting portion 25 to fit the fitting portion 25 by elastically deforming the tips thereof in a direction in which it is separated from the plate portion 34.

The connection portion 31 has a tapered surface in which the top surface of the spring portion 35 is inclined slowly downward from a portion in which the spring portion 35 most protrudes from the plate portion 34 to the plate portion 34. When the fitting portion 25 of the tab 22 is fitted to the connection portion 31, the fitting portion 25 can be guided to a position between the plate portion 34 and the spring portion 35 by the tapered surface.

Figure 6:
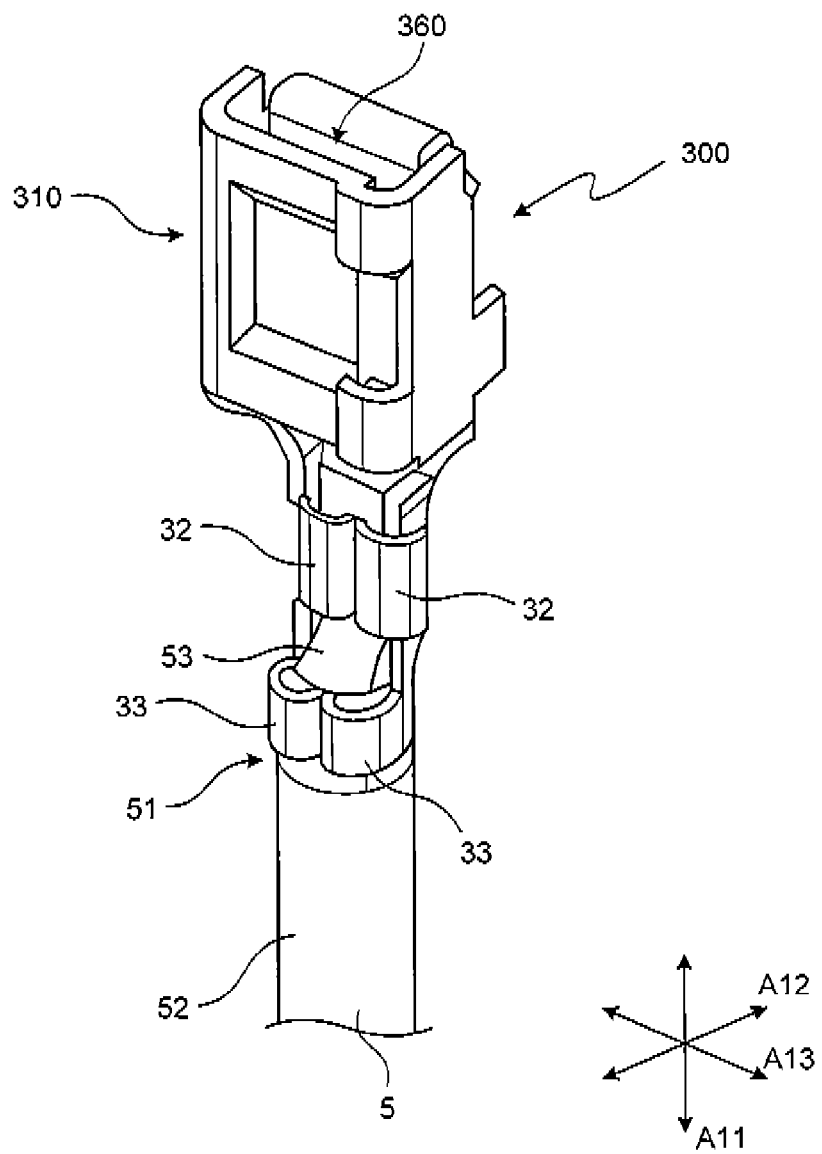
FIG. 6 is a perspective view illustrating another configuration of the terminal fitting according to the embodiment.

FIG. 5 illustrates an example of the terminal fitting 3 in which the connection portion 31 is called a fastening type, but the terminal fitting 3 is not limited to this type. For example, like a terminal fitting 300 according to a modification example illustrated in FIG. 6, a connection portion 310 may be configured to have a substantially tubular shape, to provide the inside of a tubular portion 360 with a plate-like spring portion, and to press the fitting portion 25 of the tab 22 against the inner wall of the tubular portion 360 with the spring portion to fit the fitting portion to the connection portion. In the terminal fitting 300 illustrated in FIG. 6, the same elements as in the terminal fitting 3 (FIG. 5) are referenced by the same reference numerals in the drawings. In FIGS. 5 and 6, the configuration in which the terminal fitting 3 or 300 is connected to the terminal portion 51 of the electrical wire 5 is illustrated, but the terminal fitting may be connected to a connecting substrate, a connector, or the like.

The housing member 4 is a resinous casing for accommodating and holding the relay 2 and the terminal fittings 3 and includes a first housing chamber 41 that guides and accommodates the relay body 21 therein and a second housing chamber 42 that accommodates and holds the terminal fittings 3 therein. In this embodiment, the housing member 4 is treated as a single member which is independent of the electrical junction box. Accordingly, the housing member 4 is provided with a locking portion 40, protruding from the housing member 4, that can engage with a locked portion (for example, locking groove) formed in a casing of the electrical junction box so as to attach the housing member to the casing of the electrical junction box. By causing the locking portion 40 to engage with the locked portion, the housing member 4 can be locked and attached to the casing of the electrical junction box. Here, the housing member may be formed as a part of the casing of the electrical junction box and may be treated as a unified body so as not to be detached from the electrical junction box. The numbers of relays 2 and terminal fittings 3 which are accommodated in the housing member 4 are not particularly limited. In this embodiment, as illustrated in FIG. 1, the configuration in which two relays 2 are accommodated in one housing member 4 is assumed. In other words, the housing member 4 includes two sets of relay accommodating spaces including one first housing chamber 41 and two second housing chambers 42. Since each relay 2 is provided with four tabs 22, eight terminal fittings 3 are accommodated in one housing member 4. Since two tabs 22 are disposed on each of the left side surface 21c and the right side surface 21d of the relay body 21, a pair of second housing chambers 42 are disposed to face each other in the housing member 4 with the first housing chamber 41 interposed therebetween and two terminal fittings 3 are accommodated in each second housing chamber 42.

The first housing chamber 41 includes a bottom portion 43 and a wall portion 44 that extends upright from the bottom portion 43 and that guides the relay body 21 as illustrated in FIGS. 3A and 3B. The wall portion 44 extends upward in a frame shape from the bottom portion 43 so as to surround the side surfaces (the left side surface 21c, the right side surface 21d, the front surface 21e, and the back surface 21f) of the relay body 21 along the side surfaces and guides and accommodates the relay body 21 to and in the first housing chamber 41. Accordingly, a concave space which is surrounded with the bottom portion 43 and the wall portion 44 and of which the top is opened to the outside is formed as a space for accommodating the relay body 21 in the first housing chamber 41. In this case, the first housing chamber 41 has a substantially rectangular parallelepiped shape larger than the relay body 21 so as to smoothly accommodate the relay body 21 guided by the wall portion 44.

As illustrated in FIG. 1, a locking groove 44a for engaging with a protrusion 23 formed on the front surface 21e is formed on the wall portion 44 extending upright to face the front surface 21e of the relay body 21. Accordingly, in a state in which the relay body 21 is accommodated in the first housing chamber 41, the protrusion 23 can engage with the locking groove 44a to lock the relay body 21 to the first housing chamber 41. That is, the assembling force between the relay 2 and the housing member 4 due to the fitting of the tabs 22 and the terminal fittings 3 can be complemented using engagement between the protrusion 23 and the locking groove 44a. If the complement is not necessary, the protrusion 23 and the locking groove 44a may be skipped. As illustrated in FIGS. 3A and 3B, the bottom portion 43 may be provided with a reinforcing rib 43a protruding downward.

The second housing chambers 42 are disposed in the outside of the first housing chamber 41 interposing the wall portion 44 therebetween, are surrounded with rectangular tubular frames formed by the wall portion 44 and a frame portion 45 of the housing member 4, and form a rectangular parallelepiped space of which the top and the bottom are opened to the outside. The second housing chambers 42 are provided with a locking piece (hereinafter, referred to as a lance) 46 for holding the terminal fitting 3.

The lance 46 is integrally formed in a cantilever shape by drawing the same resin as the housing member 4 from the wall portion 44 or the frame portion 45 to the second housing chamber 42. In the configuration illustrated in FIGS. 3A and 3B, a lance 46a located on the left side is drawn from the wall portion 44, and a lance 46b located on the right side is drawn from the frame portion 45. Accordingly, the lance 46 forms a so-called spring mechanism, and achieves fixation of the terminal fitting 3 to the second housing chamber 42 and holds the terminal fitting 3 in the second housing chamber 42 by pressing and locking the lower edge of the spring portion 35 of the terminal fitting 3 with a restoration force from the elastic deformation.

As illustrated in FIGS. 3A and 3B, the relay 2 is assembled into the housing member 4 in a state in which the terminal fittings 3 are held in the second housing chambers 42. As described above, in this embodiment, each fitting portion 25 extends from the protruding tip of the base end 24 along the side surfaces (the left side surface 21c and the right side surface 21d) of the relay body 21 with a gap from the side surfaces without causing the extending tip to protrude beyond the bottom surface 21b of the relay body 21. That is, when the relay 2 faces the first housing chamber 41 and the second housing chambers 42 from above the housing member 4 so as to assemble the relay 2 into the housing member 4, the relay body 21 protrudes more than the tabs 22, that is, the bottom surface 21b protrudes more than the fitting portions 25, toward the housing member 4.

Accordingly, in assembling the relay 2 into the housing member 4, the relay body 21 can be inserted into the first housing chamber 41 before fitting the fitting portions 25 of the tabs 22 to the connection portions 31 of the terminal fittings 3 (the state illustrated in FIG. 3A). At this time, since the relay body 21 can be guided along the wall portion 44 of the housing member 4, it is possible to prevent inclination of the relay 2 with respect to the housing member 4. By preventing the inclination of the relay 2 with respect to the housing member 4, it is possible to position the relay 2 with respect to the housing member 4 in an appropriate insertion posture and to direct the tabs 22 in an appropriate insertion direction into the terminal fittings 3. Accordingly, it is possible to smoothly fit the fitting portions 25 to the connection portions 31 without inserting the tabs 22 into the terminal fittings 3 in a direction other than the appropriate insertion direction and thus to effectively avoid a problem that the spring portion 35 is damaged to reduce the fitting force. In assembling the relay 2 into the housing member 4, the relay body 21 only has to be inserted into and accommodated in the first housing chamber 41. Accordingly, the insertion destination target is large and it is thus possible to easily assemble the relay 2 into the housing member 4. In this way, according to this embodiment, it is possible to achieve improvement in workability in assembling the relay 2 into the housing member 4.

Since the tabs 22 protrude from the left side surface 21c and the right side surface 21d of the relay body 21 and extend along the side surfaces, the tabs do not enter blind spots by being covered with the relay body 21 and the fitting state can be visually checked in fitting the tabs 22 to the terminal fittings 3. Accordingly, for example, it is possible to fit the fitting portions 25 to the connection portions 31 while checking the positions, inclinations, and the like of the fitting portions. In this way, since the tabs 22 can be directed in the appropriate insertion direction into the terminal fittings 3 with eyes, it is possible to achieve improvement in both working accuracy and workability in fitting the fitting portions 25 to the connection portions 31.

In the relay 2 assembled into the housing member 4, the relay body 21 is not placed on the housing member 4 unlike in the related art, that is, the relay body 21 does not protrude from the housing member 4. Accordingly, the height (the size in the up-down direction) of the relay module 1 can be suppressed to the height of the housing member 4 and it is thus possible to achieve a decrease in profile of the relay module 1. Accordingly, in mounting the relay module 1 on a vehicle, it is possible to increase a degree of freedom of the mounting position or arrangement of devices in the vicinity thereof and to save an on-board space. For example, the relay module 1 may be mounted in a horizontal direction, a downward direction, an inclined direction, or the like as well as in the upward direction (for example, the direction in which the relay 2, the terminal fittings 3, and the housing member 4 are assembled as illustrated in FIG. 3B) of the up-down direction.

Here, the height position of the relay body 21 in the state in which the relay 2 is assembled into the housing member 4 is determined depending on the position at which the fitting portions 25 of the tabs 22 are fitted to the connection portions 31 of the terminal fittings 3. That is, in each terminal fitting 3, the connection portion 31 fitted to the fitting portion 25 of the tab 22 is held at the height position (at the same height) at which the connection portion faces the side surface of the relay body 21 accommodated in the first housing chamber 41 with the wall portion 44 interposed therebetween in the second housing chamber 42. The top surface of the wall portion 44 is positioned at a predetermined height position below the top surface of the frame portion 45 so as not to come in contact with the base end 24 of the tab 22 when the fitting portion 25 of the tab 22 is fitted to the connection portion 31 of the terminal fitting 3. The bottom portion 43 is positioned at a predetermined height position at which the bottom portion does not come in contact with the bottom surface 21b of the relay body 21. Accordingly, since the relay 2 is held in the housing member 4 without interfering with the bottom portion 43 or the top end surface of the wall portion 44 except for a part in which the fitting portion 25 of the tab 22 is fitted to the connection portion 31 of the terminal fitting 3 in the height direction of the housing member 4, it is possible to satisfactorily connect the tabs 22 and the terminal fittings 3 to each other and to stabilize the holding force of the relay 2.

Even in a state in which the tabs 22 are accommodated in the second housing chambers 42 and the fitting portions 25 are fitted to the connection portions 31, that is, in a state in which the relay 2 is electrically connected to the electrical wire 5 via the terminal fittings 3, the tabs 22 are not covered with the relay body 21 and the base ends 24 thereof are directed to the outside (see FIG. 3B). Accordingly, it is possible to access the tabs 22 from above the housing member 4 and thus to easily check electrification of the relay 2. At this time, for example, even when plural relays 2 are accommodated in the housing member 4, it is possible to easily work from above the housing member 4 using a common checker.

In the relay 2, since fitted portions of the connection portions 31 of the terminal fittings 3 and the fitting portions 25 of the tabs 22 are electrically-connecting portions to the electrical wires 5, heat is more easily generated than from other portions. However, in this embodiment, even in a state in which the relay 2 is assembled into the housing member 4 and the tabs 22 are accommodated in the second housing chambers 42, it is possible to easily discharge heat generated from the connected portions (fitted portions) via the base ends 24 to the outside. In addition to this heat dissipation effect, since the top surface 21a is directed to the outside even in a state in which the relay body 21 is accommodated in the first housing chamber 41, it is possible to easily discharge heat generated through the relay operation via the top surface 21a. Accordingly, it is possible to prevent a rise in temperature of the relay 2 and to markedly reduce an influence of heat on the relay operation. On the other hand, since the side surfaces (the left side surface 21c, the right side surface 21d, the front surface 21e, and the back surface 21f) of the relay body 21 are covered with the wall portion 44 in the state in which the relay body is accommodated in the first housing chamber 41, operating noise generated from the inside of the relay body 21 is not diffused to the outside well and it is thus possible to achieve a decrease in noise.

As described above, in this embodiment, since the relay body 21 can be guided along the wall portion 44 of the housing member 4 in assembling the relay 2 into the housing member 4, it is possible to prevent inclination of the relay 2 at the time of assembly to stabilize the posture and to achieve improvement in workability. The housing member 4 may be configured to include an interference portion 47 interfering with the relay 2 at the time of assembly of the relay 2. By employing this configuration, even when the relay 2 is inclined at the time of assembly into the housing member 4, the relay 2 can interfere with the interference portion 47 and it is thus possible to prevent excessive inclination of the relay 2 with respect to the housing member 4. In this embodiment, the housing member 4 is provided with the interference portion 47 in consideration of prevention of inclination of the relay 2 and additional improvement in workability at the time of assembly, but the interference portion 47 may be omitted to simplify the configuration.

Such an interference portion 47 may include at least one of a first interference portion 47a and a second interference portion 47b. The first interference portion 47a can be disposed in the first housing chamber 41 so as to interfere with the relay body 21 to regulate the receiving angle of the relay body 21 in the first housing chamber 41 when the relay 2 is inclined at the time of assembly into the housing member 4. On the other hand, the second interference portion 47b can be disposed in the second housing chamber 42 so as to interfere with the fitting portion 25 of the tab 22 to regulate the fitting angle of the fitting portion 25 to the connection portion 31 of the terminal fitting 3 when the relay 2 is inclined at the time of assembly into the housing member 4.

Figure 7:
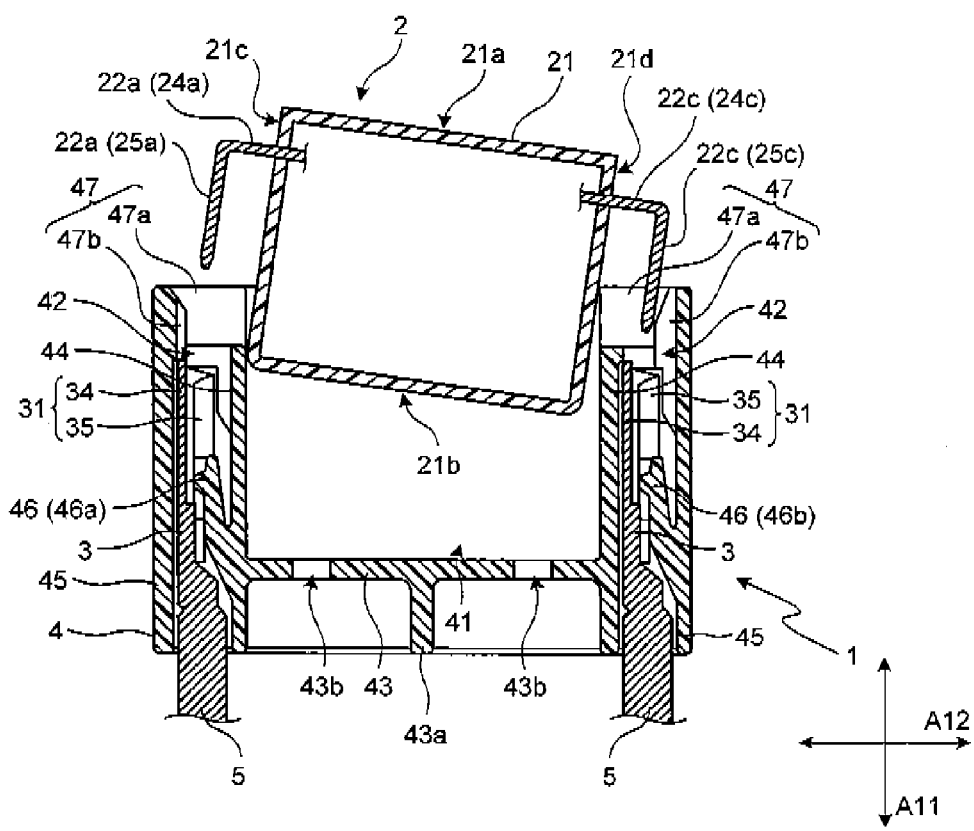
FIG. 7 is a cross-sectional view illustrating an example of a state in which a main body section of the relay interferes with an interfere portion.

The first interference portion 47a is configured to extend from the top of the wall portion 44 of the first housing chamber 41 to the top of the frame portion 45. The second interference portion 47b is configured to protrude from the top of the frame portion 45 to the wall portion 44. By providing one or both of the first interference portion 47a and the second interference portion 47b, it is possible to cause the relay body 21 to interfere with the first interference portion 47a or to cause the tab 22 to interfere with the second interference portion 47b even when the relay 2 is inclined at the time of assembly of the relay 2 into the housing member 4. Accordingly, it is possible to prevent excessive inclination of the relay 2 and thus to suppress the inclination within an appropriate range. FIG. 7 illustrates an example of a state in which the relay body 21 interferes with the first interference portion 47a and the second interference portion 47b. In this case, the inclination of the relay 2 is regulated by the first interference portion 47 and the second interference portion 47b and the relay is not inclined any more. By guiding the relay body 21 along one or both of the first interference portion 47 and the wall portion 44 in this state, the relay 2 can be reversed to an appropriate insertion posture into the housing member 4 and the vicinity of the lower end of the relay body 21 can be inserted into the first housing chamber 41 (the state illustrated in FIG. 3A). Accordingly, since the tabs 22 can be directed in the appropriate insertion direction into the terminal fittings 3, the fitting portions 25 can be smoothly fitted to the connection portions 31 by inserting the tabs 22 in this state.

The height of the first interference portion 47a and the second interference portion 47b (the size from the bottom portion 43 of the housing member 4 in the up-down direction) can be set to substantially the same height (the same position in the up-down direction) as the top surface 21a of the relay body 21 in the state in which the relay 2 is assembled into the housing member 4. By setting the heights of the first interference portion 47a and the second interference portion 47b to this height in the state in which the relay 2 is assembled, the top edge of the first interference portion 47a and the second interference portion 47b can be made to be substantially flush with the top surface 21a of the relay body 21 (the state illustrated in FIG. 3B). Accordingly, for example, when the top surface 21a of the relay body 21 protrudes more than the top edge of the first interference portion 47a and the second interference portion 47b, it is possible to easily understand a half-fitted state in which the tabs 22 and the terminal fittings 3 are not completely fitted to each other, and the like.

In this embodiment, heat generated from the relay 2 can be discharged to the outside from the base ends 24 of the tabs 22, the top surface 21a of the relay body 21, and the like, but the housing member 4 may be configured to easily discharge heat. For example, as illustrated in FIGS. 2, 3A, and 3B, the housing member 4 may be configured to have through-holes 43b, which are opened to the outside, in the bottom portion 43. Accordingly, it is possible to easily discharge heat generated from the relay body 21 through the relay operation or the like to the outside from the through-holes 43b. Therefore, it is possible to effectively prevent heat generated from the relay body 21 from being confined to the first housing chamber 41 and thus to additionally reduce an influence of the heat on the relay operation. By forming the through-holes 43b, it is possible to achieve an effect of easily discharging water via the through-holes 43b to the outside even when the first housing chamber 41 is immersed in water.

In this embodiment, the terminal fittings 3 accommodated in two second housing chambers 42 are maintained in a state in which the protruding directions of the spring portions 35 are the same (see FIGS. 3A and 3B). In other words, the lances 46 are disposed in the second housing chambers 42 so as to lock all the terminal fittings 3 in a state in which the protruding directions of the spring portions 35 are the same. Accordingly, when the terminal fittings 3 are received into the second housing chambers 42 and are held by the lances 46, it is possible to simply check the directions of the terminal fittings 3 and to skip an operation of reversing the terminal fitting 3 (direction reversing operation). A complicated operation is not necessary even when the assembly of the terminal fittings 3 into the second housing chambers 42 is automated.

Here, in the above-mentioned embodiment, as illustrated in FIG. 4, the relay configuration is employed in which the base ends 24 of the tabs 22 protrude in a flat plate shape extending in parallel to the top surface 21a and the bottom surface 21b of the relay body 21 and the fitting portions 25 extend in a flat plate shape extending in parallel to the left side surface 21c and the right side surface 21d of the relay body 21. The relay configuration according to the present invention is not limited to the configuration illustrated in FIG. 4 as long as each fitting portion 25 extends from the protruding tip of the base end 24 along the side surfaces of the relay body 21 with a gap from the side surfaces without causing the extending tip to protrude beyond the deep surface (the bottom surface 21b) of the relay body 21 in the receiving direction into the housing member 4. For example, relay configurations according to first to eleventh modification examples illustrated in FIGS. 8 to 18 may be employed. Even when these modification examples are employed, the same operations and advantages as in the relay 2 can be achieved.

The relay configurations according to the first to eleventh modification examples will be described below. The basic configurations of the relays according to the modification examples are the same as the relay 2 according to this embodiment. Accordingly, elements equal or similar to those in this embodiment will be referenced by the same reference signs in the drawings, description thereof will not be repeated, and differences from the relay 2 will be described below. When the relay configurations according to the modification examples are employed, the terminal fittings 3 and the housing member 4 may be configured to correspond to the relay configurations (specifically, the arrangement of tabs of the relays) such that the first housing chamber 41 and the second housing chamber 42 are disposed in the housing member 4, that is, the positions of the second housing chambers relative to the first housing chamber 41 are set and the terminal fittings 3 are assembled into the housing member 4 (the second housing chambers 42) to correspond to the fitting positions to the tabs 22. In any modification example, the number of tabs 22 and the width or thickness thereof can be arbitrarily set and the protruding positions or protruding lengths of the base ends 24, the height position of the extending tips of the fitting portions 25, the extending lengths of the fitting portions from the base ends 24, and the like can be arbitrarily set. For example, these settings may be the same for all the tabs 22 or may be different depending on the tabs 22 in the modification examples.

Figure 8:
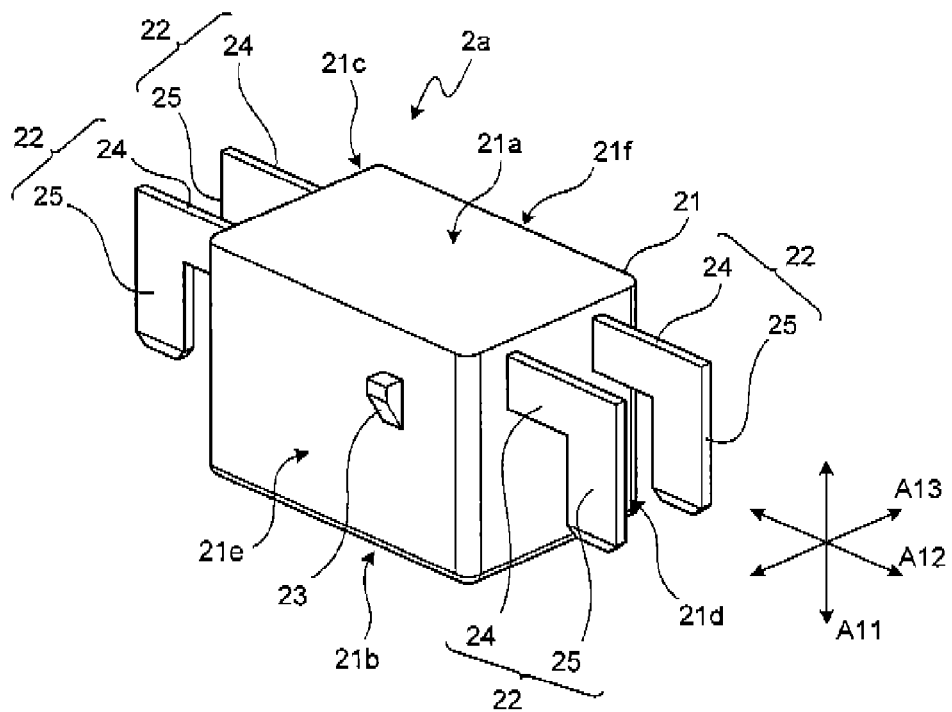
FIG. 8 is a perspective view illustrating a configuration of a relay according to a first modification example.

FIG. 8 illustrates the configuration of a relay 2a according to the first modification example. In the relay 2a, the tabs 22 are configured such that the base ends 24 and the fitting portions 25 are formed in a flat plate shape extending in parallel to the front surface 21e and the back surface 21f. In this case, the relay 2a includes four tabs 22, two tabs among the tabs 22 are disposed on the left side surface 21c of the relay body 21 and two tabs are disposed on the right side surface 21d. In the four tabs 22, the base ends 24 protrude by the same length from the same height (the same position in the up-down direction). The two tabs 22 on each side surface (the left side surface 21c and the right side surface 21d) protrude from the side surfaces with the same gap (which may be different) therebetween. The fitting portions 25 of the four tabs 22 are bent substantially at right angle and downward from the protruding tips of the base ends 24 and extend to be parallel to the front surface 21e and the back surface 21f. Here, the fitting portions 25 extend by the same size from the base ends 24 such that the positions (height) of the extending tips in the up-down direction are the same.

In the relay configuration illustrated in FIGS. 4 and 8, the base ends 24 of the tabs 22 protrude from a pair of side surfaces (the left side surface 21c and the right side surface 21d) located in the longitudinal direction (the right-left direction) of the relay body 21, but the base ends 24 may protrude from only one side surface, from two neighboring side surfaces, or from more side surfaces.

Figure 9:
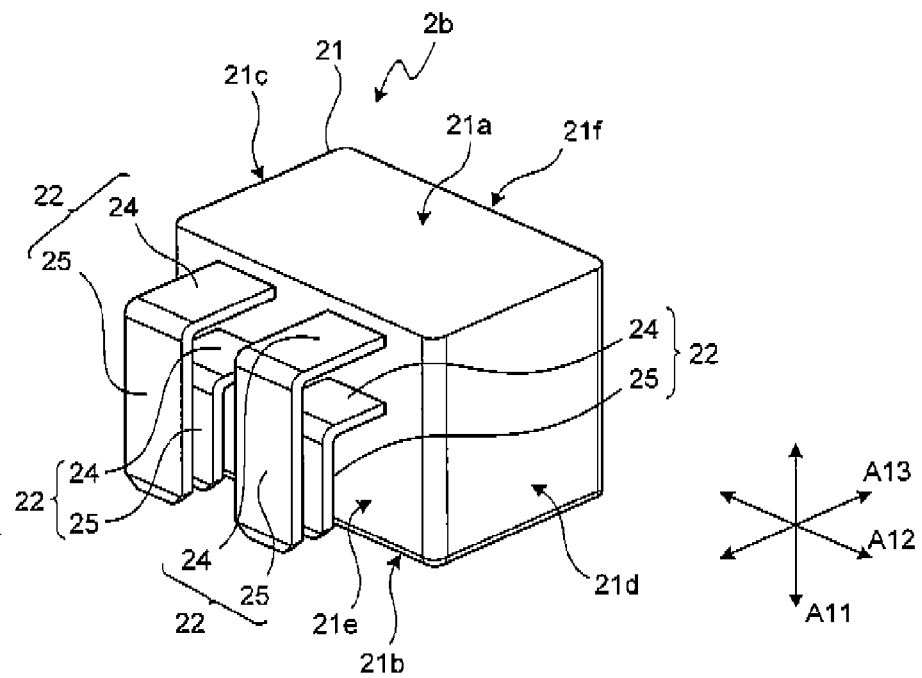
FIG. 9 is a perspective view illustrating a configuration of a relay according to a second modification example.
Figure 10:
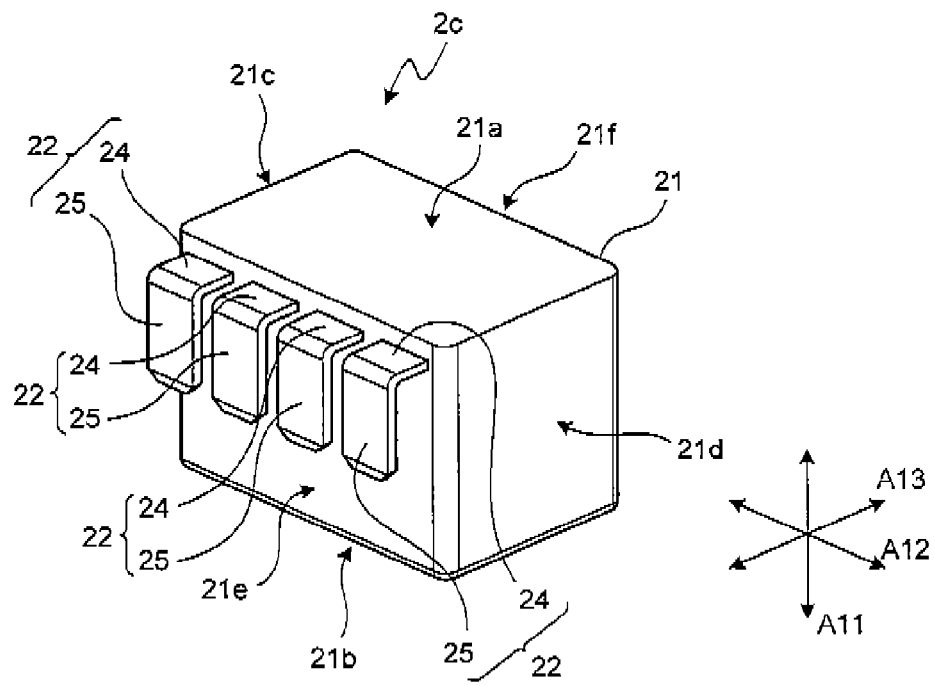
FIG. 10 is a perspective view illustrating a configuration of a relay according to a third modification example.

FIGS. 9 and 10 illustrate the configurations of the second modification example and the third modification example in which the base ends 24 of the tabs 22 protrude from only one side surface (the front surface 21e) of the relay body 21. In a relay 2b according to the second modification example illustrated in FIG. 9, among four tabs 22, the base ends 24 of two tabs 22 protrude from the vicinity of the top end of the front surface 21e and the base ends 24 of the other two tabs 22 protrude from the lower portion thereof. On the other hand, in a relay 2c according to the third modification example illustrated in FIG. 10, the base ends 24 of four tabs 22 protrude at the same height from the vicinity of the top end of the front surface 21e.

Figure 11:
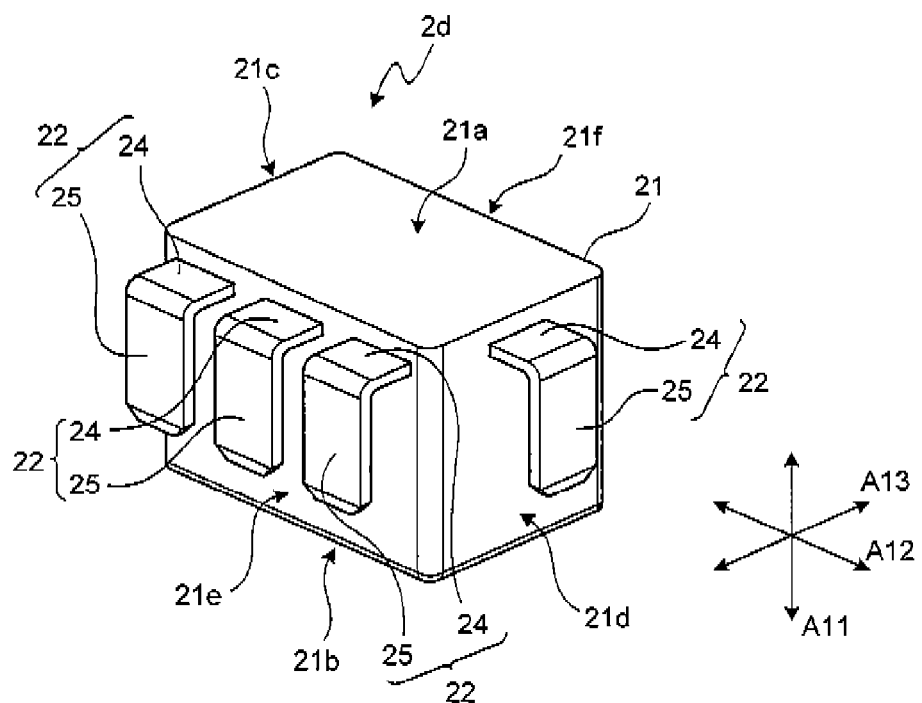
FIG. 11 is a perspective view illustrating a configuration of a relay according to a fourth modification example.
Figure 12:
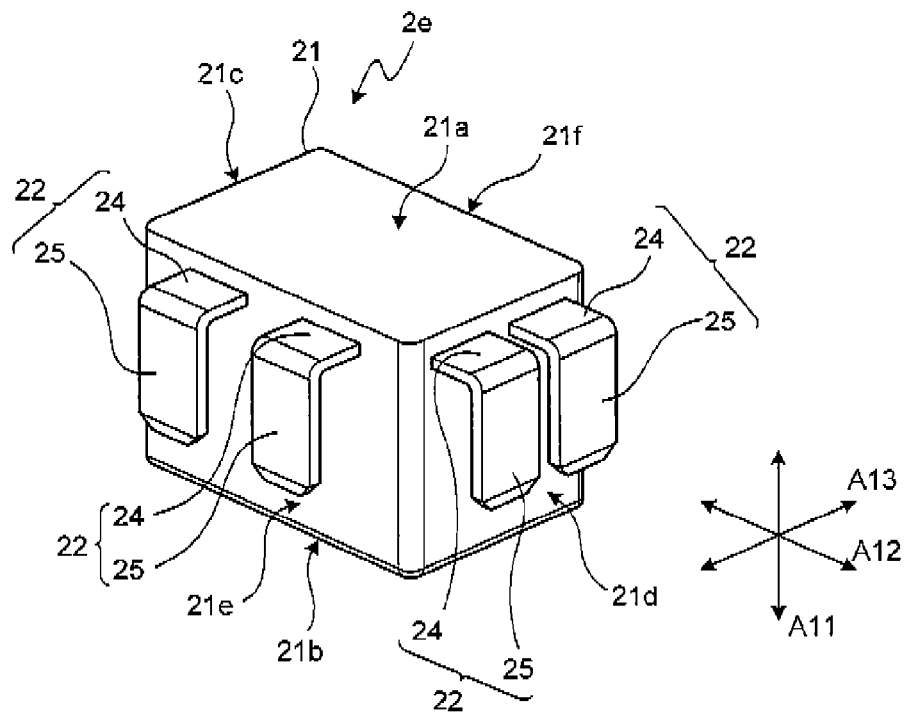
FIG. 12 is a perspective view illustrating a configuration of a relay according to a fifth modification example.

FIGS. 11 and 12 illustrate the configurations of the fourth modification example and the fifth modification example in which the base ends 24 of the tabs 22 protrude from two neighboring side surfaces (the front surface 21e and the right side surface 21d) of the relay body 21. In a relay 2d according to the fourth modification example illustrated in FIG. 11, among four tabs 22, the base ends 24 of three tabs 22 protrude from the vicinity of the top end of the front surface 21e and the base end 24 of the other one tab 22 protrudes at the same height from the right side surface 21d. On the other hand, in a relay 2e according to the fifth modification example illustrated in FIG. 12, among four tabs 22, the base ends 24 of two tabs 22 protrude from the vicinity of the top end of the front surface 21e and the base ends 24 of the other two tabs 22 protrude at the same height from the right side surface 21d.

Figure 13:
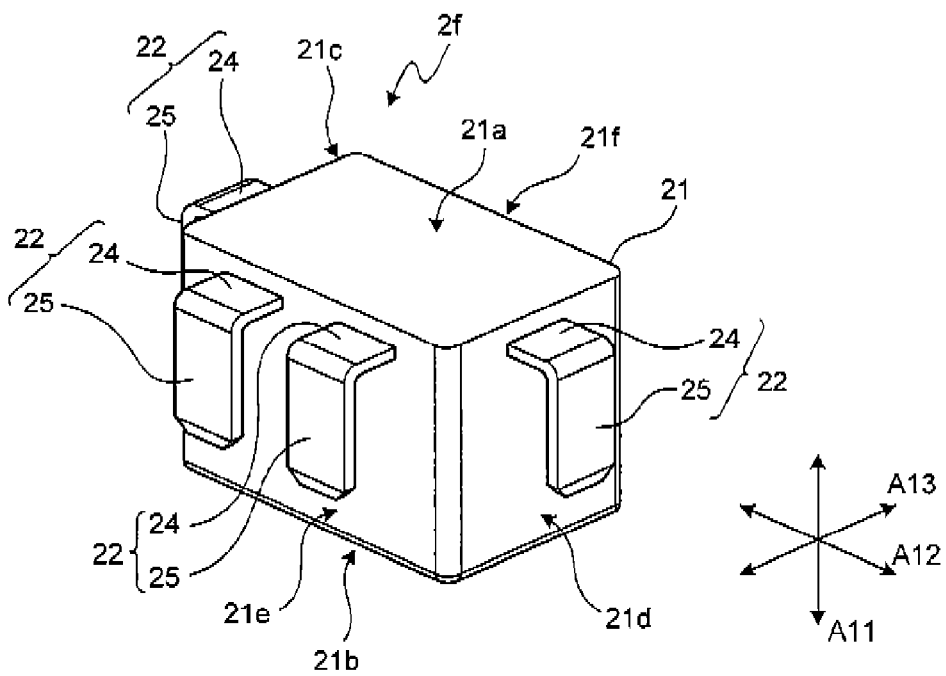
FIG. 13 is a perspective view illustrating a configuration of a relay according to a sixth modification example.

FIG. 13 illustrates the configuration of the sixth modification example in which the base ends 24 of the tabs 22 protrude from three side surfaces (the left side surface 21c, the front surface 21e, and the right side surface 21d) of the relay body 21. In a relay 2f according to the sixth modification example, among four tabs 22, one tab protrudes from the left side surface 21c, two tabs protrude from the front surface 21e, and one tab protrudes from the right side surface 21d.

In the first to sixth modification examples (FIGS. 8 to 13), the fitting portions 25 of the four tabs 22 are bent substantially at right angle and downward from the protruding tips of the base ends 24 and extend to be parallel to the side surface from which the base ends 24 protrude. Here, the fitting portions 25 extend by the same size from the base ends 24 such that the positions (height) of the extending tips in the up-down direction are the same. The neighboring tabs 22 on the same side surface are arranged with the same gap (which may be different) therebetween.

In the relay configurations illustrated in FIG. 4 and FIGS. 8 to 13, the base ends 24 of the tabs 22 protrude from the side surfaces of the relay body 21, but the base ends 24 may protrude from the top surface 21a of the relay body 21 as in the seventh to eleventh modification examples illustrated in FIGS. 14 to 18. In the seventh to eleventh modification examples, the base ends 24 of four tabs 22 protrude from the top surface 21a and are bent substantially at right angle to the side surfaces and extend. The fitting portions 25 of the tabs 22 are bent substantially at right angle and downward from the base ends 24 and extend by the same size from the base ends 24 such that the positions (height) of the extending tips in the up-down direction are the same.

Figure 14:
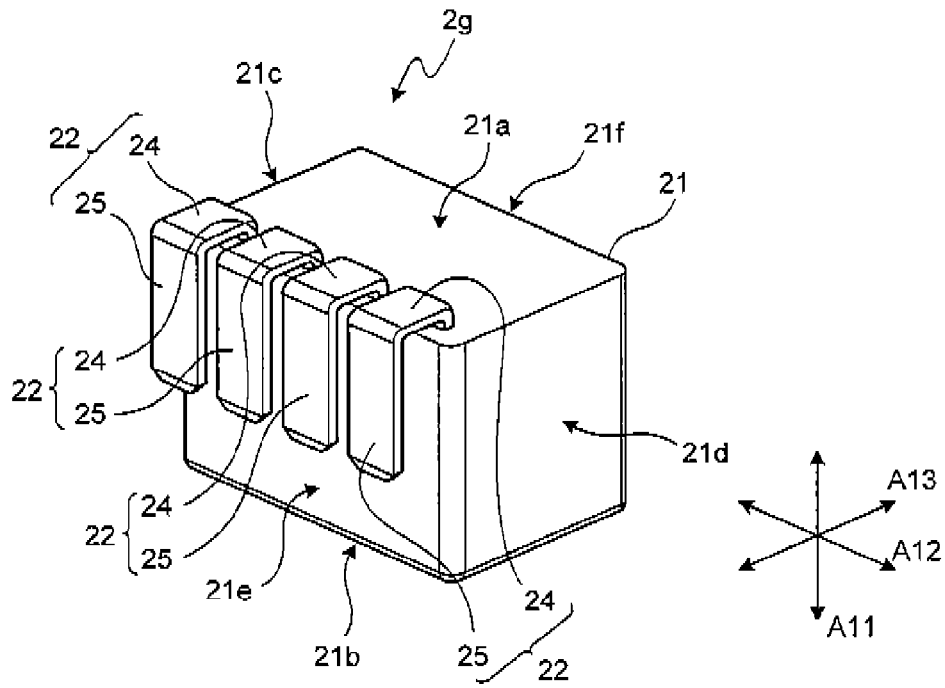
FIG. 14 is a perspective view illustrating a configuration of a relay according to a seventh modification example.
Figure 15:
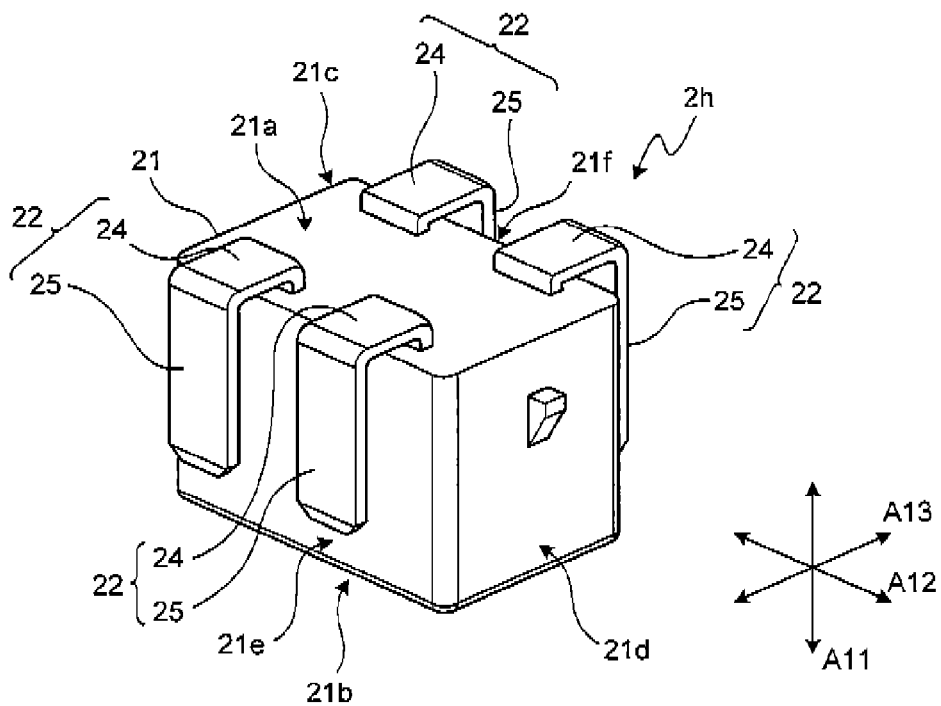
FIG. 15 is a perspective view illustrating a configuration of a relay according to an eighth modification example.
Figure 16:
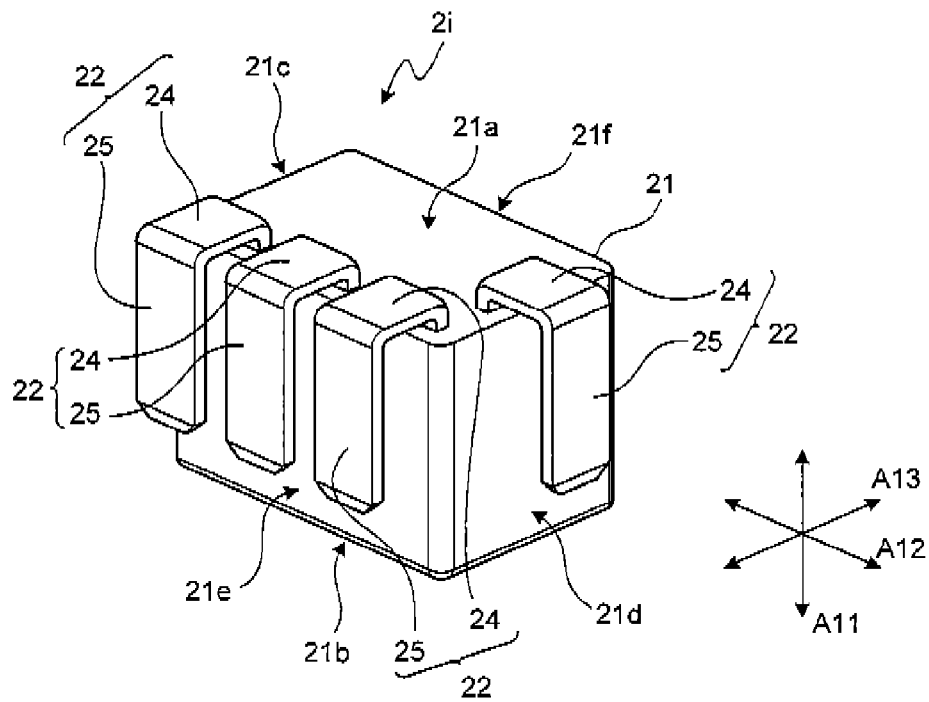
FIG. 16 is a perspective view illustrating a configuration of a relay according to a ninth modification example.
Figure 17:
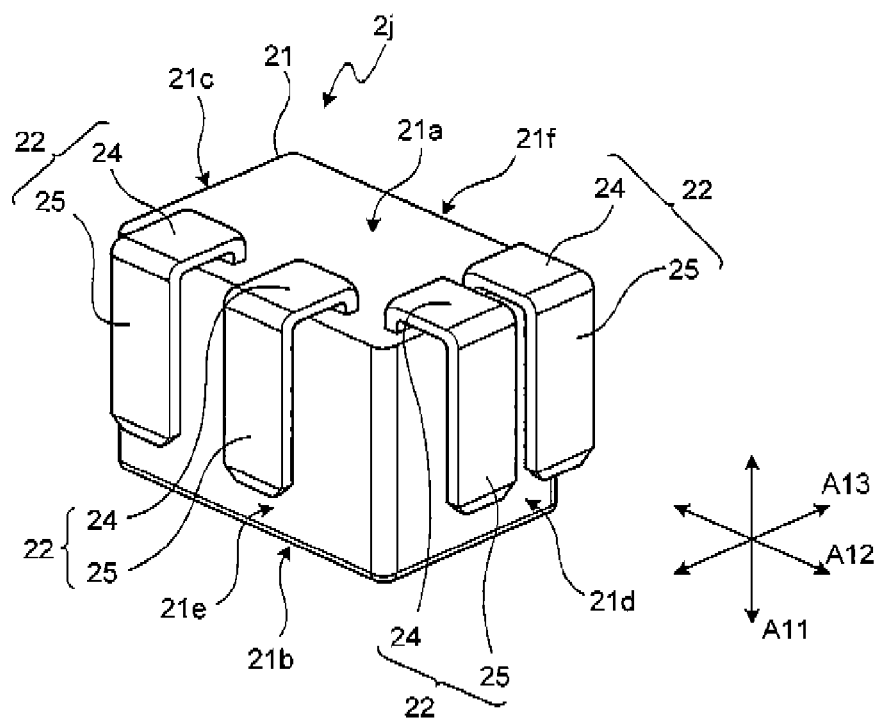
FIG. 17 is a perspective view illustrating a configuration of a relay according to a tenth modification example.
Figure 18:
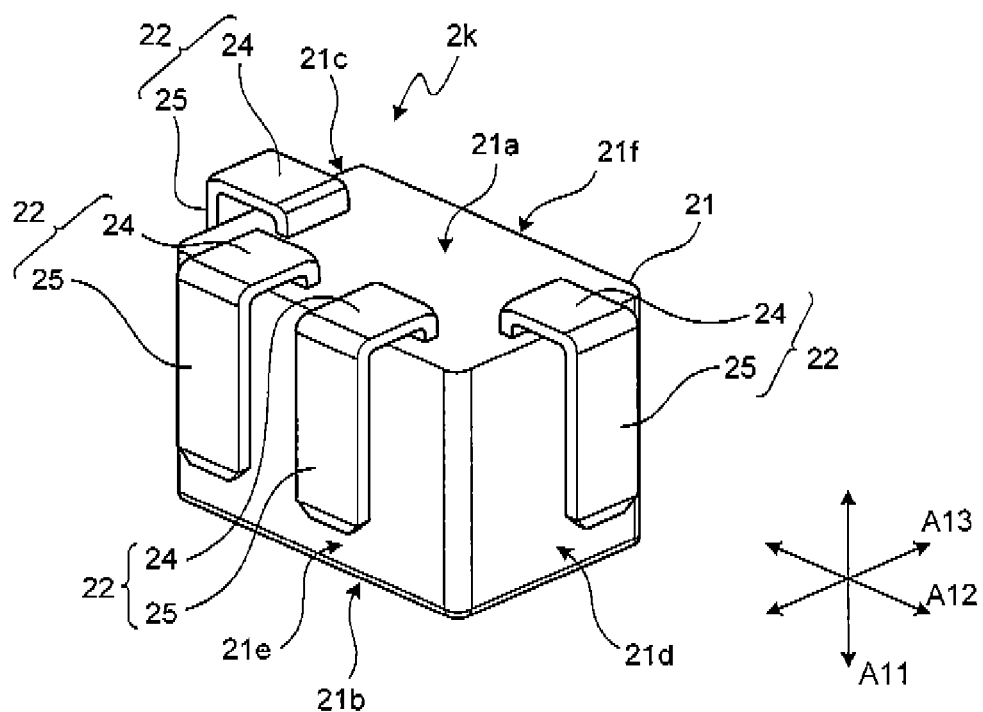
FIG. 18 is a perspective view illustrating a configuration of a relay according to an eleventh modification example.
Figure 19:
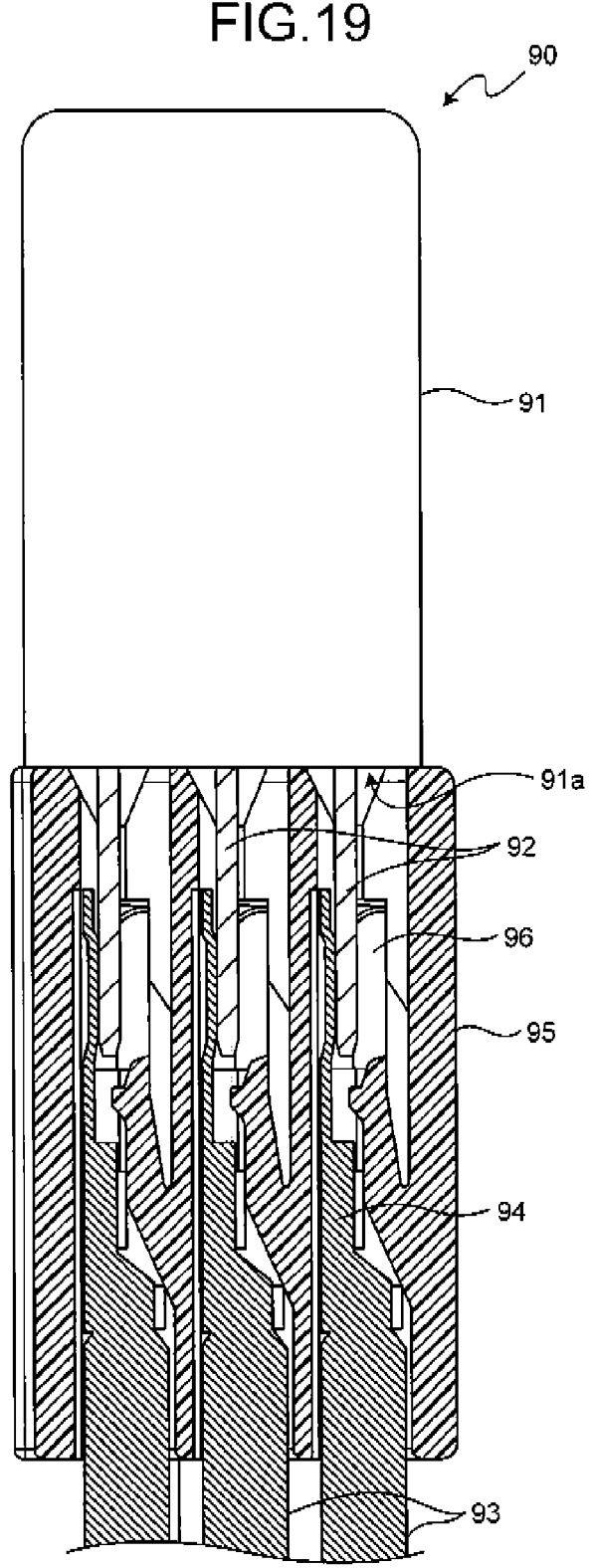
FIG. 19 is a longitudinal-sectional view of a relay module according to the related art.

In a relay 2g according to the seventh modification example illustrated in FIG. 14, the fitting portions 25 of four tabs 22 extend from the base ends 24 to be parallel to the front surface 21e. In a relay 2h according to the eighth modification example illustrated in FIG. 15, among the fitting portions 25 of four tabs 22, two fitting portions extend from the base ends 24 to be parallel to the front surface 21e and the other two fitting portions extend from the base ends 24 to be parallel to the back surface 21f. In a relay 2i according to the ninth modification example illustrated in FIG. 16, among the fitting portions 25 of four tabs 22, three fitting portions extend from the base ends 24 to be parallel to the front surface 21e and the other one fitting portion extends from the base end 24 to be parallel to the right side surface 21d. In a relay 2j according to the tenth modification example illustrated in FIG. 17, among the fitting portions 25 of four tabs 22, two fitting portions extend from the base ends 24 to be parallel to the front surface 21e and the other two fitting portions 25 of the tabs 22 extend from the base ends 24 to be parallel to the right side surface 21d. In a relay 2k according to the eleventh modification example illustrated in FIG. 18, among the fitting portions 25 of four tabs 22, one fitting portion extends from the base end 24 to be parallel to the left side surface 21c, two fitting portions extend from the base ends 24 to be parallel to the front surface 21e, and the other one fitting portion extends from the base end 24 to be parallel to the right side surface 21d.

Figure 20A:
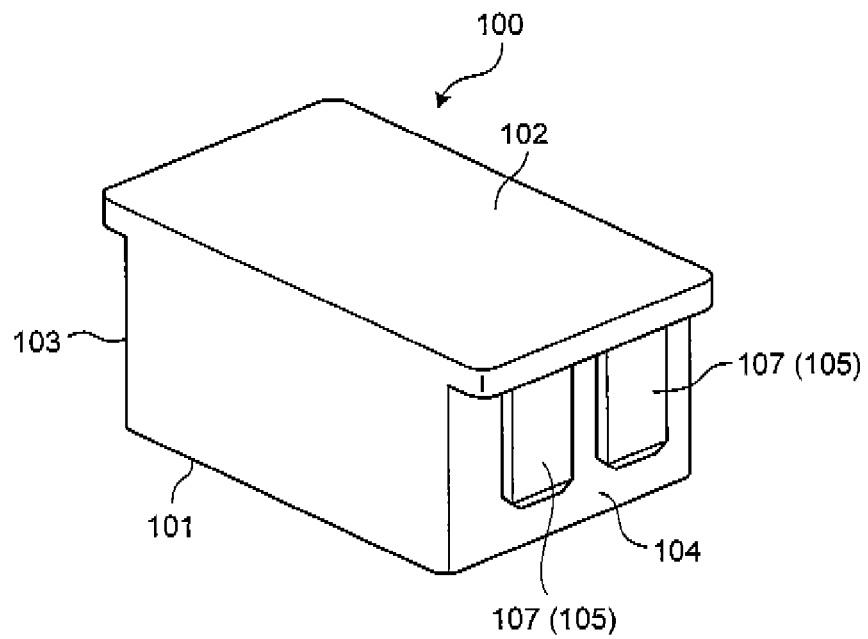
FIG. 20A is a perspective view illustrating an appearance of a relay in which a base end of a lead terminal is surrounded with a resin.

In the above-mentioned relays, the base ends of all the lead terminals are completely exposed, but at least parts of the base ends may be covered with a resin. FIG. 20A is a perspective view illustrating appearance of a relay in which the base ends of the lead terminals are covered with a resin, and FIG. 20B is a side view of the relay illustrated in FIG. 20A.

Figure 20B:
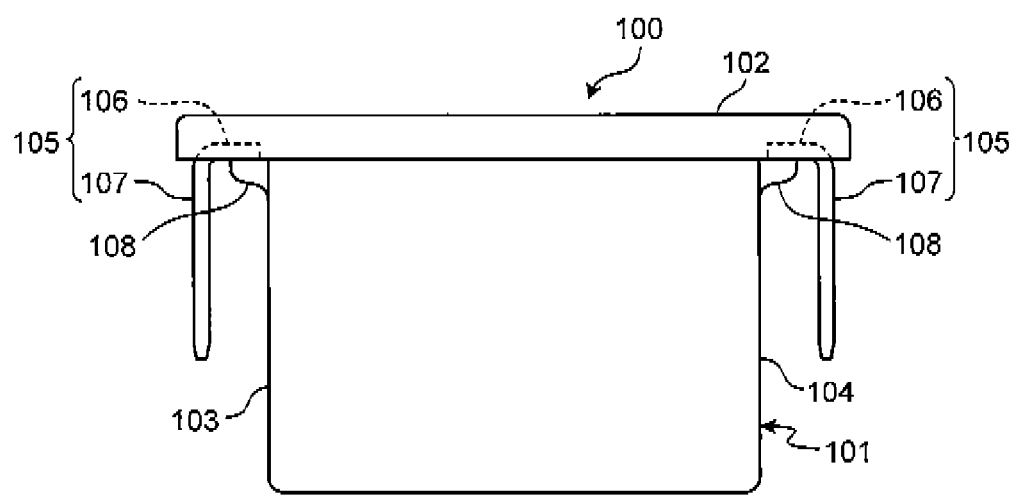
FIG. 20B is a side view of the relay illustrated in FIG. 20A.

As illustrated in FIGS. 20A and 20B, a plate-like insulating member 102 is assembled into a relay 100 along one surface (for example, surface corresponding to the top surface 21a in the embodiment) of a relay body 101. The insulating member 102 is formed in a substantially rectangular shape in a plan view by molding an insulating resin. The insulating member 102 extends in a direction perpendicular to a pair of side surfaces 103 and 104 of the relay body 101 which are disposed to face each other. Each of the side surfaces 103 and 104 is provided with two lead terminals 105. The lead terminals 105 are disposed such that contact portions 107 thereof face the side surfaces 103 and 104. The insulating member 102 is formed to cover base ends 106 of the lead terminals 105.

As illustrated in FIG. 20B, the base ends 106 of the lead terminal 105 are covered with the insulating member 102 in the axial direction thereof and the contact portions 107 of the lead terminals 105 are disposed to protrude from the bottom surface of the insulating member 102. Protrusions 108 are formed to have a level difference at positions at which the insulating member 102 and the side surfaces 103 and 104 intersect each other. The protrusions 108 come in contact with the top surface of the wall portion at the time of assembly of the relay 100 into the housing member. The base ends 106 of the lead terminals 105 may be disposed to protrude from the protrusions 108 or may be disposed to protrude from the side surfaces 103 and 104 of the relay body 101.

According to this configuration, the base ends 106 of the lead terminals 105 can be supported from the upper side by the insulating member 102. Accordingly, since a load applied to the lead terminals 105 at the time of insertion of the lead terminals 105 into the terminal fittings can be greatly reduced, it is possible to prevent deformation of the lead terminals 105. As a result, it is possible to keep the electrical connection state between the lead terminals 105 and the terminal fittings good and to prevent a decrease in the holding force of the relay 100 to the housing member. By covering the base ends 106 of the lead terminals 105 with the insulating member 102, it is possible to prevent short-circuit between neighboring lead terminals 105.

The present invention can achieve improvement in workability in assembling an electronic component in an electronic component module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component assembly structure comprising:
    an electronic component;
    a terminal fitting configured to be fitted to the electronic component; and
    a housing member configured to accommodate the electronic component and the terminal fitting, wherein
    the electronic component includes a main body section having a plurality of surfaces and a terminal portion that is disposed in the main body section and that is fitted to the terminal fitting,
    the housing member includes a first housing chamber that guides and accommodates the main body section and a second housing chamber that accommodates and holds the terminal fitting,
    the terminal portion includes a base end and a fitting portion that extends from a protruding tip of the base end and that is fitted to the terminal fitting,
    the fitting portion extends from the protruding tip of the base end, along a side surface of the main body section with a gap from the side surface, without causing an extending tip to protrude beyond the deep surface of the main body section in the receiving direction into the first housing chamber, and
    the electronic component, the terminal fitting, and the housing member are mutually assembled.

2. The electronic component assembly structure according to claim 1, wherein
    the housing member includes an interference portion that interferes with the electronic component at the time of assembly of the electronic component,
    the interference portion includes at least one of a first interference portion and a second interference portion,
    the first interference portion is disposed in the first housing chamber so as to interfere with the main body section to regulate inclination of the electronic component when the electronic component is inclined, and
    the second interference portion is disposed in the second housing chamber so as to interfere with the fitting portion to regulate inclination of the electronic component when the electronic component is inclined.

3. The electronic component assembly structure according to claim 1, wherein
    the first housing chamber includes a bottom portion and a wall portion that extends upright from the bottom portion and that guides the main body section, and
    a through-hole that is opened to the outside is formed in the bottom portion.

4. The electronic component assembly structure according to claim 2, wherein
    the first housing chamber includes a bottom portion and a wall portion that extends upright from the bottom portion and that guides the main body section, and
    a through-hole that is opened to the outside is formed in the bottom portion.

5. An electrical junction box comprising:
    the electronic component assembly structure according to claim 1.

6. An electrical junction box comprising:
    the electronic component assembly structure according to claim 2.

7. An electrical junction box comprising:
    the electronic component assembly structure according to claim 3.

8. An electrical junction box comprising:
    the electronic component assembly structure according to claim 4.

* * * * *